May 5, 1964

R. C. ROE 3,131,865

HEAT STORAGE FOR BUILDING HEATING

Filed March 20, 1961

INVENTOR.
RALPH C. ROE.
BY
Ward, Neal, Haselton, Orme & McChannon
ATTORNEYS.

3,131,865
HEAT STORAGE FOR BUILDING HEATING
Ralph C. Roe, Tenafly, N.J., assignor to Burns and Roe, Inc., New York, N.Y., a corporation of New Jersey
Filed Mar. 20, 1961, Ser. No. 96,865
4 Claims. (Cl. 237—16)

This invention relates to the storage of heat for use in building heating, and more particularly, to a method and apparatus for storing heat during utility off-peak production periods for use during peak production periods to heat a given space.

At present, considerable interest is developing among utilities and equipment manufacturers in systems for the storage of heat during off-peak periods for use in building heating. Among the prospective advantages of such systems are the ability of consumers to charge heat storage facilities with heat during off-peak periods when power rates are reduced, such heat to be utilized during peak periods, and the ability of utilities to even out their production curves, that is, to reduce the difference between maximum and minimum output during a given production cycle so as to operate at a more nearly uniform rate.

Heretofore, various proposals have been made concerning the utilization of such systems, but thus far, none has achieved any appreciable commercial success primarily because of the inability of the systems to store sufficient heat for efficient use. Thus, it has been proposed to use water for storing heat because of its low cost. But storage tanks containing water for the present purpose would fall outside the ASME Code requirements for unfired pressure vessels wherein maximum pressure is limited to about 15 p.s.i.g. and maximum temperature to about 250° F. If the heating range of the air to be heated is selected at between 70° F. and 120° F., for example, the low temperature of the water storing heat for transfer to the air could not be less than 150° F. so that the temperature range for heat storage for water could be no larger than 100° F. Thus, an excessively large volume of water would be necessary and corresponding space requirements make water unattractive as a heat storage medium.

In view of recent technological developments, it is now possible to store large quantities of heat and to make that heat available for use when desired. However, such storage involves exceedingly high temperatures so that the problem of dangerous overheating when utilizing the stored heat is quite serious.

I have conceived by my invention, a novel system that enables me to store heat efficiently during off-peak charging periods and to utilize such stored heat for building heating during peak power production periods and without any possibility of dangerous overheating.

In essence, my invention resides in the utilization of heat storage means and heating elements transferring heat to be stored to the storage means as well as control means actuating the heating elements during a predetermined period such as an off-peak utility power production period. Additionally, means are provided directing a flow of fluid in heat transfer relation with the heat storage means and thence to an area to be heated during a second predetermined period such as a peak production period, and to provide assured safety against overheating, an initial flow of unheated fluid is directed to the area upon each actuation of the fluid flow directing means.

The control means may include time switch mechanism set to operate according to the peak and off-peak periods for the particular area involved; or radio impulse signals could be delivered to the system through utility lines to the buildings being served by the systems, for example.

As a feature of my invention, I may utilize a high heat transfer liquid salt such as "Hitec" marketed by E. I. du Pont de Nemours & Company, Inc., for example, as a heat storage means, the same being contained in one or more tanks and heated therein by suitable heating elements such as electrical immersion heaters or gas or other fuel fired burners. In order to reduce the cost of the fluid, high specific heat solids may be placed in the tanks and the voids therearound filled with the fluid, if desired. This feature of the invention contemplates employment of solid heat storage means such as carbon, soapstone, concrete, fire clay or other materials having high specific heat, particularly at high temperatures. According to this aspect of the invention, the storage means may be in the form of solid plates and electrical heaters may be embedded within the plates to provide the heat for storage.

As another feature of the invention, a fluid, such as air or water, is directed first into contact with the surface of the heat storage means, to be heated thereby, and thence to the space or area to be heated. Where tanks of fluid are used to store heat, the air or water is passed over a surface area thereof; and, where water is used, the area and time of contact of the water with the tank surface is such as to obviate vaporization of the water. Where solid plates are used to store the heat, the fluid such as air or water is merely passed over the plates to be heated thereby, and is then directed to the area to be heated. Again, vaporization of water is avoided by prearranging the time and surface area of contact of the water with the plates.

A particularly important feature of the invention resides in the provision of means directing an initial flow of unheated fluid to the area to be heated upon actuation of the fluid flow directing means. Thus, suitable valve and control mechanisms are provided in the hot air or hot water system so that a flow of unheated air or water, as the case may be, precedes the flow of heated air or water from the heat storage means, thereby insuring that excessive heat will not be delivered to the area to be heated. After the initial flow of unheated fluid, unheated and heated fluid are mixed to provide the desired temperature in the area to be heated. As the heat storage medium gives up its heat, the proportion of unheated to heated air or water, as the case may be, is altered to maintain the area at a selected temperature. The importance of this feature of the invention will be appreciated when it is realized that with facilities presently available, it is possible to store heat at exceedingly high temperatures. For example, "Hitec" may be heated to temperatures of the order of 1000° F., at atmospheric pressure. Thus, the dangerous effects of overheating the fluid directed to the area to be heated are exceedingly severe.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

A specific embodiment of the invention has been chosen for purposes of illustration and description, and is shown in the accompanying drawings, forming a part of the specification, wherein.

Figure 1:
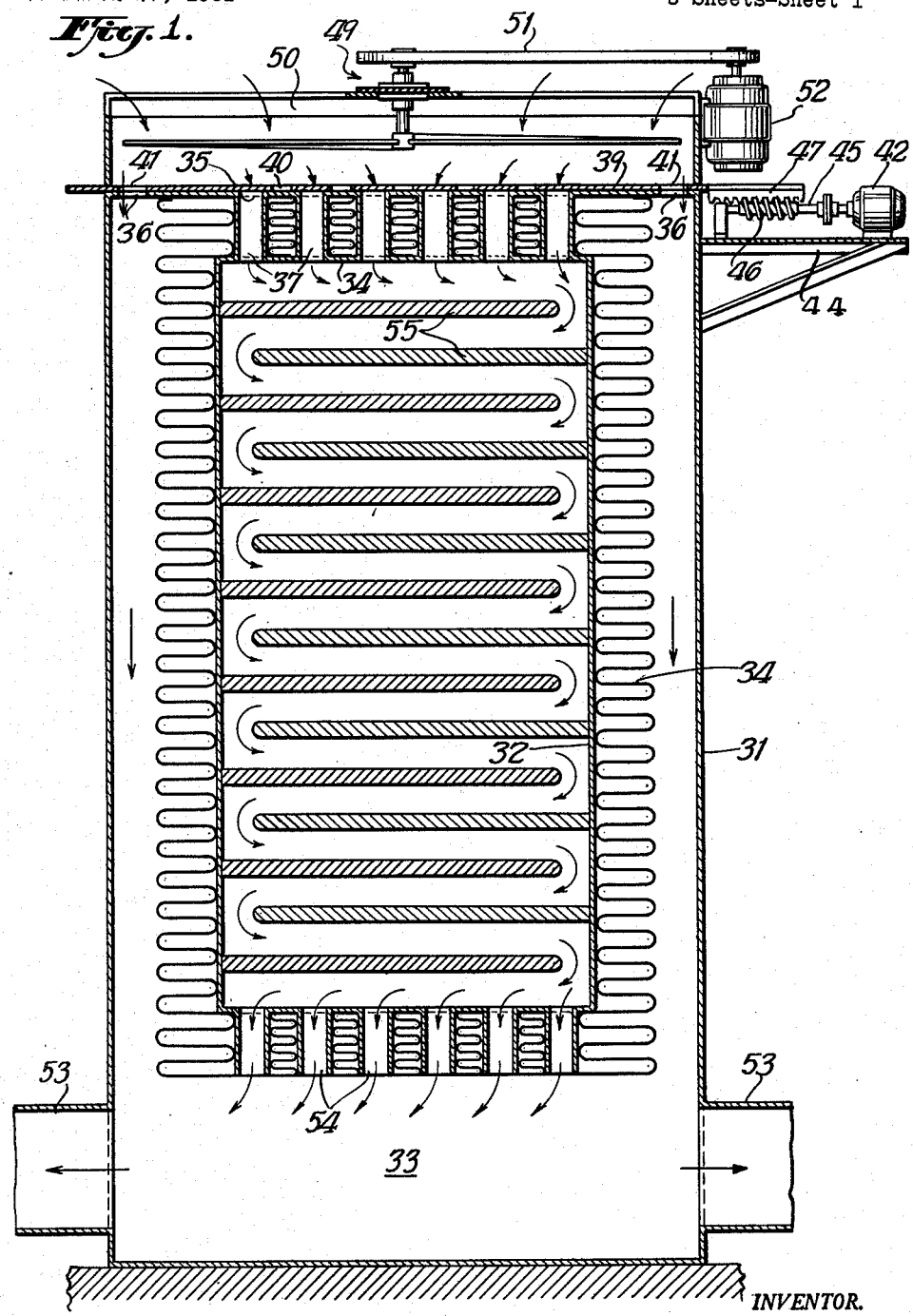
FIG. 1 is a vertical sectional view illustrating apparatus in accordance with one form of the invention.
Figure 2:
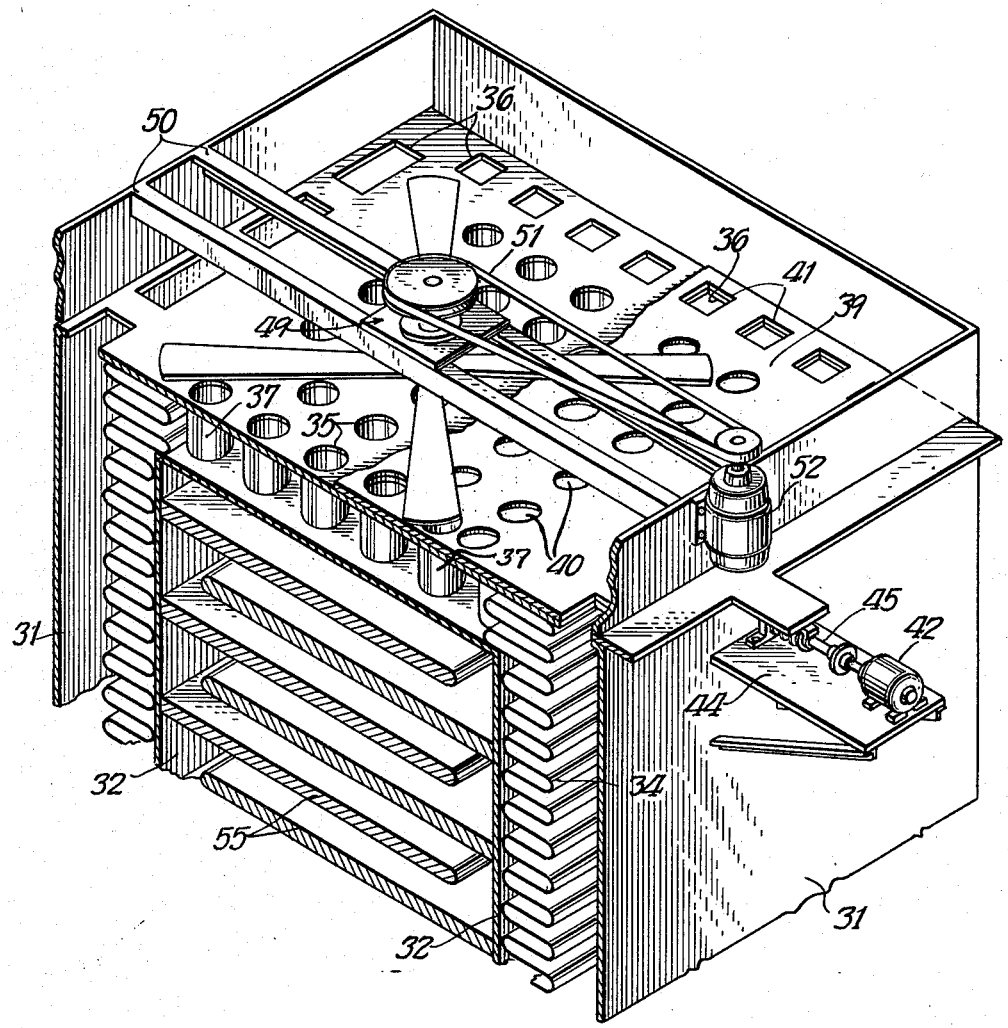
FIG. 2 is a perspective view, partly broken away, of the apparatus shown in FIG. 1.

Referring now to the drawings, and more particularly to FIGS. 1 and 2 thereof, there is shown a system in accordance with the present invention comprising an outer housing 31 enclosing an inner housing 32 which is insulated as at 34 against the transfer of heat through its sides, bottom and top. The inner housing 32 and its insulation are positioned within the outer housing 31 so as to provide an air space between the insulation and the side walls of the outer housing, and a somewhat larger air space 33 between the insulation and the bottom of the outer housing.

The top surface of the outer housing 31 is provided with a series of circular apertures 35 spaced inwardly of the marginal regions thereof, and with a series of rectangular openings 36 adjacent the edges thereof and positioned over the air space between the insulation 34 and the skin of the outer housing 31. The inner apertures 35 communicate with the interior of the inner housing 32 through short ducts 37 which pass through the insulation 34 between the tops of the two housings.

The upper surface of the outer housing 31 with its apertures 35 and openings 36, actually constitutes a part of a valve mechanism which also includes a damper plate 39 formed with a series of apertures 40 intermediate its marginal regions and a series of openings 41 adjacent its edges. The apertures 40 and openings 41 are so positioned as to be fully registerable with the apertures 35 and the openings 36, respectively, although not simultaneously. That is, the various apertures and openings are so arranged that when the openings 41 are in registry with the openings 36, the apertures 40 are not registered with the apertures 35, but the plate 39 is movable so that as it starts to close the openings 36, the apertures 40 and 35 begin to come into registry, wherefore the apertures 35 and 40 and the openings 36 and 41, respectively, may be in partial registry simultaneously.

The position of the damper plate 39 is regulated by any suitable apparatus capable of sliding the same relatively to the top of the outer housing 31, and by way of example, I have shown a reversible motor 42 supported on a platform 44 adjacent the upper end of the housing and having a shaft 45 equipped with a helical thread 46 engageable with a helically recessed segment 47 secured to the undersurface of the plate 39.

A fan 49 is conveniently supported above the plate 39, as by a pair of brackets 50 and is driven through a belt 51 by a motor 52.

It will be seen that the interior of the inner housing 32 also communicates with the large air space 33 in the outer housing 31 beneath the insulation 34 by means of a series of ducts 54 passing through the insulation and opening into the bottom surface of the inner housing 32.

Within the housing 32, there is positioned a plurality of horizontally disposed, spaced apart solid plates 55 which preferably extend the full depth of the inner housing and a major portion of the width thereof. These plates 55 are alternately supported on the opposed walls of the inner housing so that they are staggered relatively to one another as illustrated, and may be formed of any suitable, solid heat storing medium such as soapstone, concrete or carbon, for example. Each plate is provided with electrical heating elements (not shown) which are embedded therein.

In the operation of this form of the invention, the heaters embedded within the plates 55 are actuated by time switches, radio impulses or the like, at the beginning of a utility off-peak production period, and during that period the plates 55 are charged with and store heat. The off peak period may comprise a sixteen hour period of each day with the peak period comprising the remaining eight hour period, for example, although it will be understood that the actual periods will vary in different areas. During the peak period, these heaters are deactivated and, as the thermostat in the space to be heated calls for heat, the motor 52 operates the fan 49. Again, it is important to realize that at the start of operation, the plate 39 is so positioned relatively to the top surface of the outer housing 31 that the apertures 35 are closed and the openings 36 are uncovered. The signal that controls the motor 42 is momentarily delayed so that as the fan 49 is actuated, unheated air moves downwardly through the opuenings 36, the air space between the insulation 34 and the outer housing 31 and out of the housing through the delivery ducts 53 to the space to be heated. Thereafter, the damper plate 39 is shifted slightly by operation of the damper plate positioner motor 42 so that the openings 36 are slightly closed and the apertures 35 are slightly opened. Thus, a portion of air from the fan 49 moves unheated through the air space between the insulation 34 and the housing 31, and the remaining air passes through the ducts 37 and thence along the tortuous path between succeeding plates 55, becoming heated thereby, and thence downwardly through the lower ducts 54 into the air space 33 and out of the housing through the main delivery ducts 53. Since, as mentioned before, it is possible with facilities presently available to store heat at temperatures greatly exceeding those to which a building is normally heated, the air leaving the ducts 54 must be mixed with cooler air to bring it down to the temperature called for. Thus, the heated air mixes with the unheated air in the chamber 33 so that air at the desired temperature is delivered to the space to be heated. As heat is drained from the heat storing medium and its temperature decreases, the damper plate 39 may be shifted to open the ducts 37 wider while further restricting the openings 36. As heat is drained from the heat storing plates 55, and its temperature decreases, and this fact is sensed as by thermostat (not shown), the plate 39 is automatically shifted so as to further restrict the openings 36 while opening the apertures 35 wider so that the desired temperature is maintained throughout the system operating period in the space being served.

When the peak period is terminated, the heating elements embedded in the plates 55 are against actuated. If the building requires no heat at that time, the fan 49 is shut off, and the plate 39 is shifted into position completely closing the apertures 35 and fully uncovering the openings 36, thus completing a cycle of operation and setting the system up for another cycle. This can be accomplished by the use of conventional control means to actuate the motor 42, e.g. a timing mechanism timed to become operative at the end of a peak period or means sensing the lack of flow of air. However, should the building call for heat during the off-peak period, the fan and valves would operate as described to supply the heat requirements while, at the same time, the heating elements embedded in plates 55 supply heat to recharge the plates as well as the heat necessary to supply the building. In this connection, it will be remembered that the capacity of the heating elements is several times the heat requirements of the space to be heated at any one time.

If water were used instead of air to heat the building, appropriate piping and valving would replace the plate 40, fan 49 and their respective controls and the water would be passed in heat transfer relation with the housing 32 at a rate of flow sufficiently high to prevent vaporization. Instead of flowing around the housing, tubes could be fitted in the housing and the water pumped through the tubes.

Figure 3:
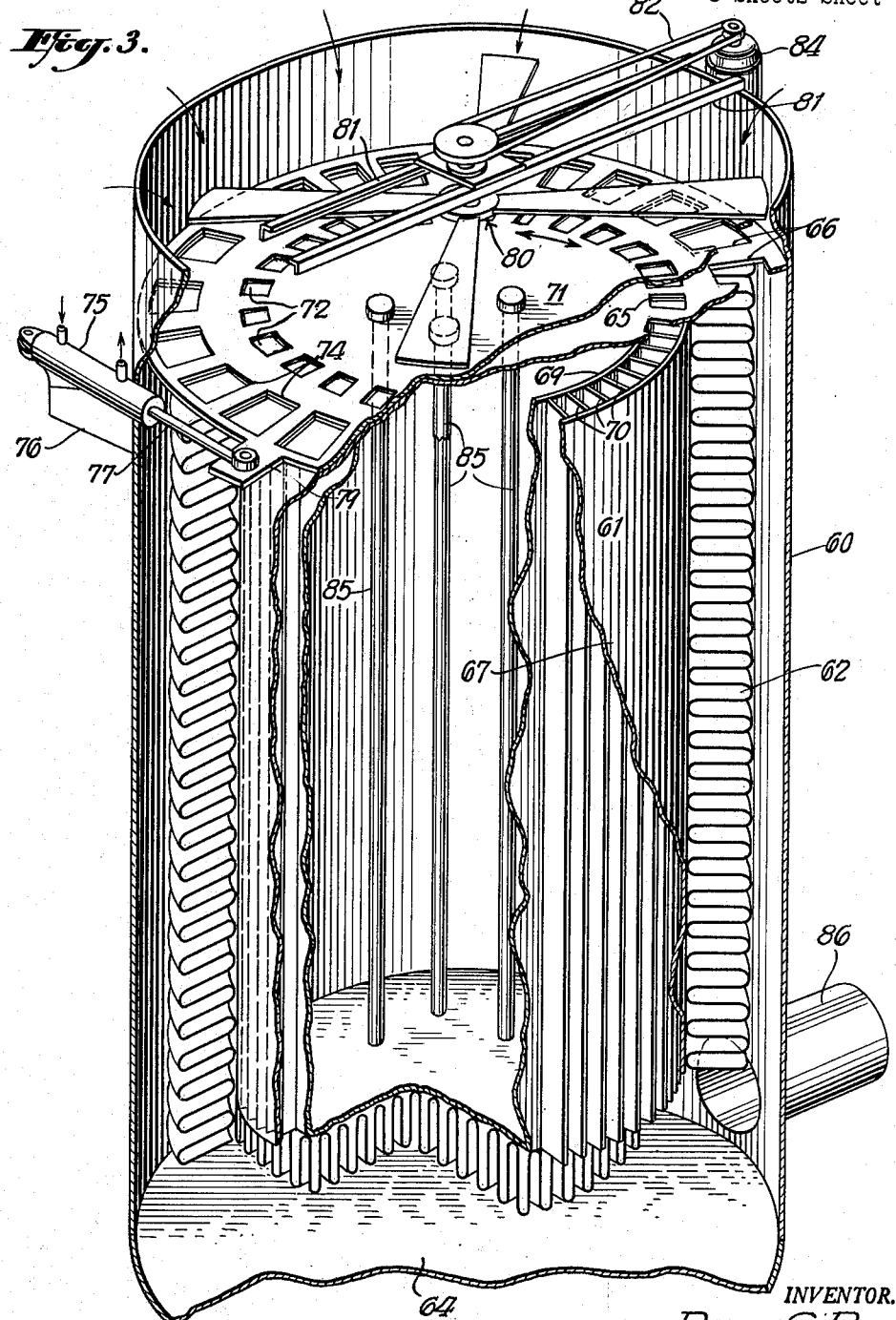
FIG. 3 is a perspective view, partly broken away, illustrating another form of the invention.

With reference to FIG. 3, there is shown a system comprising a cylindrical outer housing 60 enclosing a double walled inner housing 61 which is insulated as at 62 against the transfer of heat through its sides, bottom and top. The inner housing 61 and its insulation are positioned within the outer housing 60 so as to provide an air space between the insulation and the side walls of the outer housing, and a somewhat larger air space 64 between the insulation and the bottom of the outer housing.

The top surface of the outer housing 60 is provided with a series of apertures 65 spaced inwardly of the marginal regions thereof and with a series of openings 66 adjacent the circumferential edges thereof, and positioned over the air space between the insulation 62 and the skin of the outer housing 60. As has been stated, the inner housing 61 has double walls 67 and 69 which are spaced from one another, and a series of fins 70 extend radially therebetween. These walls 67 and 69 of the inner housing 61 are so dimensioned that the space therebetween is positioned below the inner apertures 65 of the outer housing while the fins 70 cooperate with the walls to provide vertically extending ducts beneath the apertures 65.

The upper surface of the outer housing 60 with its apertures 65 and openings 66, actually constitutes a part of a valve mechanism which also includes a circular plate 71. The plate 71 is formed with a series of apertures 72 and with openings 74 spaced radially outwardly thereof and adjacent the circumferential edge of the plate. The apertures 72 and openings 74 are so positioned as to be fully registerable with the apertures 65 and the openings 66, respectively, although not simultaneously. That is, as in the embodiment of the invention described in connection with FIG. 1, the various apertures and openings are so arranged that when the openings 74 are in registry with the openings 66, the apertures 72 are not registered with the apertures 65, but the plate 71 is movable so that as it starts to close the openings 66, the apertures 72 and 65 begin to come into registry, wherefore these apertures and the openings, respectively, may be in partial registry simultaneously.

The position of the damper plate 71 is regulated by any suitable apparatus capable of rotating the same about its central vertical axis relatively to the top of the outer housing 60, and by way of example, we have shown a double acting hydraulic cylinder 75 pivotally supported on a bracket 76 adjacent the upper end of the outer housing and having a piston rod 77 connected to a radially extending lug 79 integral with the damper plate 71. A fan 80, similar to the fan 49 described in connection with FIG. 1, is conveniently supported above the plate 71, by a pair of brackets 81, and is driven through a belt 82 by a drive motor 84.

It will be seen that the ducts formed by the inner housing walls 67 and 69 and the fins 70 communicate with the large air space 64 at the bottom of the inner housing 61. Within the housing 61 there is positioned a plurality of vertically disposed electrical immersion heaters 85 extending the full length of the housing. A heat storing medium such as "Hitec" or other suitable medium, or a combination of mediums such as Hitec and pig iron, cyclone furnace slag, soapstone or the like, surrounds the heaters 85 and fills the inner housing.

In the operation of this form of the invention, the heaters 85 extending within the inner housing 61 are actuated much in the same manner as are the heaters described in connection with the embodiment of FIG. 1, at the beginning of a utility off-peak production period and, during that period the heat storing medium is charged with and stores heat. During the peak period, these heaters 85 are de-activated and, as the thermostat in the space to be heated calls for heat, the motor 84 operates the fan 80. Again, it is important to realize that at the start of the operation, the plate 71 is so positioned relatively to the surface of the outer housing 60 that the apertures 65 are closed and the openings 66 are uncovered by the openings 74. Therefore, as the fan is actuated, air moves downwardly through the openings 66, the air space between the insulation 62 and the skin of the outer housing 60 and out of the housing through a delivery duct 86 to the space to be heated. Thereafter, the damper plate 71 is shifted slightly by operation of the hydraulic cylinder 75 so that the openings 66 begin to be closed and the apertures 65 begin to be opened by partial registry therewith by the apertures 72. Thus, a portion of the air moved by the fan 80 passes unheated through the air space between the insulation 62 and the skin of the outer housing 60, and the remaining air passes through the ducts formed by the walls 67 and 69 of the inner housing and the fins 70 thereof, this air becoming heated by contact with the walls and fins and thence flowing into the air space 64 where it mixes with the unheated air. Thus, the air which flows out of the housing through the delivery duct 86 is at the selected temperature. As heat is drained from the heat storing medium, and its temperature decreases, the plate 71 is automatically shifted so as to further restrict the openings 66 while opening the aperture 65 wider so that the desired temperature is maintained throughout the system operating period in the space being served.

When the peak period is terminated, the heating elements 85 are again actuated. As in the previously described embodiment, if the building requires no heat at that time, the fan 80 is shut off, and the plate 71 is shifted into position completely closing the apertures 65 and fully uncovering the openings 66, thus completing a cycle of operation and setting the system up for another cycle. However, should the building call for heat during the off-peak period, the system supplies the heat needs in the manner described while the heating elements 85 supply heat to recharge the heat storing medium and also to supply current heating needs, it being again understood that the capacity of these elements is several times the heat requirements of the space to be heated at any one time.

From the foregoing description, it will be seen that I have contributed a novel method and system that enables me to store heat efficiently during off-peak charging periods and to utilize the heat thus stored for building heating during peak power production periods, and without any possibility of dangerous overheating.

I believe that the construction and operation of my invention will now be understood, and that the advantages thereof will be fully appreciated by those persons skilled in the art.

I now claim:

1. In a system of the class described, a tank having inlet ducts and outlet ducts, heat insulation means enclosing said tank, a housing enclosing said tank and insulation means but remote therefrom to provide space therebetween, said housing being provided with fan means positioned adjacent said inlet ducts, a cascade of heat storing plates mounted on said tank and projecting inwardly therefrom defining fluid flow passageways therebetween, means for charging said plates with heat to be stored, said fan means adapted for directing a flow of fluid through said fluid flow passageways in heat transfer relation with said heat storing plates, said housing being provided with a transverse plate positioned adjacent said fan means and having apertures therein which correspond with such inlet ducts respectively, and also having openings therein for the passage of fluid from said fan means to said space between said housing and insulation means, a damper plate having a series of apertures positioned to register with the apertures in said transverse plate and being adjustable between a first position initially to permit the flow of fluid only through said space and further positions permitting the flow of fluid partially through said space and partially through said passageways, and a mixing chamber receiving fluid from said space and said passageway.

2. In a system of the class described, a tank having inlet openings and outlet openings, heat insulating means enclosing said tank, a housing enclosing said tank and insulation means but remote therefrom to provide space therebetween, fan means positioned adjacent said inlet openings, heat storing medium in said tank, said tank being formed with fluid flow passageway means in heat transfer relation to said heat storing medium, means for charging said medium with heat to be stored, said fan being adapted for directing a flow of fluid through said fluid flow passageway means in heat transfer relation with said heat storing medium, said housing being provided with a transverse plate positioned adjacent said fan means and having a plurality of arcuately disposed apertures therein which register with said passageway means and said space, a rotatably mounted damper plate having a series of arcuately disposed apertures positioned to register with said apertures in said transverse plate and being adjustable between a first position initially to permit the the flow of fluid only through said space and further positions permitting the flow of fluid partially through said space and partially through said passageway means, and a mixing chamber receiving fluid from said space and said passageway means.

3. In an apparatus for storing heat during utility off-peak production periods for use during peak production periods to heat a given space, the combination comprising an open-ended cylindrical tank whose walls comprise longitudinally extending fins defining air flow passageways therebetween, heat insulation means enclosing said tank, a housing enclosing said tank and insulation but remote therefrom to provide space therebetween, said housing being provided with air fan means in the open end thereof, liquid heat storing medium in said tank, means for charging said medium with heat of the order of 1000° F. or higher to be stored, said fan being adapted for directing a flow of air through said air flow passageways in heat transfer relation with said heat storing medium, said housing being provided with a transverse plate positioned adjacent the open end of said tank and having a plurality of arcuately disposed apertures therein which register with said passageways and said space, a rotatably mounted damper plate having a series of arcuately disposed apertures positioned to register with said transverse plate and being adjustable between a first position initially to permit the flow of fluid only through said space and further positions permitting the flow of fluid partially through said space and partially through said passageway, and a mixing chamber receiving air from said space and said passageway.

4. In a system of the class described, a tank having inlet and outlet openings, heat insulation means enclosing said tank, a housing enclosing said tank and insulation means but remote therefrom to provide a space therebetween, a heat storing medium in said tank, fluid flow passageway means extending between said inlet and outlet openings and in heat transfer relation with said heat storing medium, means for charging said medium with heat to be stored, fan means positioned adjacent said inlet openings and adapted to direct a flow of fluid through said fluid flow passageway means in heat transfer relation to said heat storing medium, a damper plate having a series of apertures positioned to register with said inlet openings and having openings positioned to register with said space between said housing and insulated tank, means adjusting said damper plate between a first position initially to permit the flow of fluid only through said space and further positions to permit the flow of fluid simultaneously through said space and through said passageway means, and a mixing chamber receiving said fluid from said space and said passageway means.

References Cited in the file of this patent
UNITED STATES PATENTS

| | | |
|---|---|---|
| 893,196 | Richards et al. | July 14, 1908 |
| 2,367,170 | Fahrenwald | Jan. 9, 1945 |
| 2,440,052 | Lingen et al. | Apr. 20, 1948 |
| 2,464,703 | Marshall | Mar. 15, 1949 |
| 2,517,255 | Strebe et al. | Aug. 1, 1950 |
| 2,552,837 | Blazer | May 15, 1951 |